United States Patent [19]

Gaud et al.

[11] Patent Number: 5,566,442
[45] Date of Patent: Oct. 22, 1996

[54] METHOD OF MAKING A VERTICAL MAGNETIC HEAD WITH AN INTEGRATED COIL

[75] Inventors: Pierre Gaud, St Egreve; Henri Sibuet, Le Fontamil, both of France

[73] Assignee: Commissariat a l'Energie Atomique, Paris, France

[21] Appl. No.: 357,299

[22] Filed: Dec. 13, 1994

[30] Foreign Application Priority Data

Nov. 16, 1994 [FR] France .................................. 94 13692

[51] Int. Cl.$^6$ .................................................. G11B 5/42
[52] U.S. Cl. ............................ 29/603.14; 29/603.25; 360/123; 360/125; 427/131; 427/132
[58] Field of Search .......................... 29/603.14, 603.13, 29/603.25; 360/123, 125–127; 427/131, 132

[56] References Cited

U.S. PATENT DOCUMENTS 4,260,450  4/1981  Neu .

FOREIGN PATENT DOCUMENTS

| 0152064 | 8/1985 | European Pat. Off. . |
| 0304912 | 3/1989 | European Pat. Off. . |
| 0416994 | 3/1991 | European Pat. Off. . |
| 0467263 | 1/1992 | European Pat. Off. . |
| 63-266615 | 11/1988 | Japan . |
| 63-279408 | 11/1988 | Japan . |
| 64-88911 | 4/1989 | Japan . |

Primary Examiner—Carl E. Hall
Attorney, Agent, or Firm—Oblon, Spivak, McClelland, Maier & Neustadt, P.C.

[57] ABSTRACT

Vertical magnetic head with an integrated coil and its production process wherein the head comprises two pole pieces ($30_1$, $30_2$) and two integrated coils ($50_1$, $50_2$), which are interconnected by a conductor bridge (75). A magnetic or permeability bridge (70) connects the two pole pieces and closes the circuit.

5 Claims, 10 Drawing Sheets

5,566,442

METHOD OF MAKING A VERTICAL MAGNETIC HEAD WITH AN INTEGRATED COIL

DESCRIPTION

1. Technical Field

The present invention relates to a vertical magnetic head having an integrated coil and to its production process.

Its preferred application is in general public video recording. However, it can also be used in other fields, such as that of saving data and that of computer memories.

2. Prior Art

A magnetic recording support for video, data saving or computer memories has numerous tracks on which are written informations in the form of magnetic domains.

In order to increase the information density, there is an increase not only to the number of informations per unit length, but also on the number of tracks. For this purpose there is a decrease in the width of the tracks and simultaneously the interval separating them until they are rendered contiguous.

Nowadays, in order to meet these demands, there are mainly two types of head on the market, mainly metal-in-gap heads and sandwich heads.

The attached FIG. 1 e.g. shows a head of the second type. The head shown has a substrate 2 supporting a magnetic circuit 4 constituted by a magnetic layer deposited on the upper face of the substrate, said circuit having at the front two pole pieces 5 and 7 separated by a head gap 6, which is formed by an amagnetic spacer. This head also has, above the magnetic circuit, an amagnetic superstrate 2'. Moreover, the head also has an opening 8 through the magnetic layer, the substrate and the superstrate, together with a conductor winding 9 using the opening 8.

The head shown in FIG. 1 is intended to cooperate with a recording support S oriented perpendicular to the substrate (or, what amounts to the same thing, parallel to the edge thereof).

Such heads can be called "vertical" in the sense that the active surface is perpendicular to the surface of the starting substrate. The width of the head gap designated l, is calculated perpendicular to the substrate (or, what amounts to the same thing, parallel to the recording support). Said width l essentially corresponds to the respective width of the support tracks. Its length designated L, is calculated in the direction of the relative displacement of the head and the recording support S. The height h of the head gap is calculated parallel to the face of the substrate supporting the magnetic circuit.

Such heads are not to be confused with so-called "horizontal" heads, where the gap is level with a face parallel to the substrate and where the recording support is displaced parallel to said substrate face. A horizontal head is e.g. described in FR-A-2 604 021.

One of the essential differences between vertical heads of the sandwich type and horizontal heads (apart from the obvious structural and constructional differences), is that in the latter, the width of the head gap (corresponding to the width of the track) is defined by lithography, whereas the dimension affected by wear to the head is defined by the thickness of the deposited magnetic material. In vertical heads of the sandwich type, like that of FIG. 1, it is the width l of the head gap which is defined by the deposited magnetic material thickness, whereas the wear affects the height h, which is adjusted by lithography.

The practical production of vertical heads of the sandwich type, like that of FIG. 1, involves a large number of micromechanical and welding operations at high temperature. Production is usually of a unitary nature, i.e. non-collective.

Certain production processes are in particular described in the work entitled "Recent Magnetics for Electronics", Jarect, vol. 10, chapter 11, pp. 121–133, 1983, published by Y. Sakurai, North Holland, as well as in the work entitled "The Complete Handbook of Magnetic Recording", F. Jorgensen, chapter 9, pp. 196–216, 1988, published by Tas Books Inc.

Vertical heads of the type shown in FIGS. 2 and 3 are also known, which use thin films and an integrated coil. These heads comprise a lower magnetic layer 11 and an upper magnetic layer 12, the latter overlapping the lower magnetic layer 11 and coming into contact therewith at the rear, but leaving a gap 13 at the front. Between said two magnetic layers and surrounding the rear part, there is a conductor winding 14 integrated into the structure. This winding is connected to two connections 15, 16, the connection 15 coming into contact in the center of the winding.

Such heads are e.g. described in the work by F. Jorgensen entitled "The Complete Handbook of Magnetic Recording", third edition, 1988, published by Tas Books Inc., chapter 9, "Manufacture of Head Assemblies"., pp. 190–216, particularly p. 205.

Although satisfactory in certain respects, these heads still suffer from disadvantages, particularly due to the structure of the pole pieces. These pieces 11, 12 are juxtaposed in the region of the head gap 13, so that the width of the latter, corresponding to the width of the track to be read, is equal to the width of the ends of the pole pieces (horizontal direction in FIG. 3).

The height h of the head gap (cf. FIG. 2) must not be excessive, so as to avoid magnetic saturation problems in the poles (which reduces the efficiency of the head). This reduced head gap height is contrary to what is necessary for a satisfactory behaviour with respect to wear. This height h is defined by polishing pole pieces.

The object of the invention is to obviate these disadvantages.

DESCRIPTION OF THE INVENTION

To this end, the invention proposes a magnetic head in which the two magnetic pieces defining the head gap are deposited in juxtaposed manner and no longer in superimposed manner, which leads to a limited gap width, corresponding to the thickness of the deposited magnetic layers (and not to the width thereof). This arrangement reduces wear problems, because the wear affects the height of the head gap, i.e. the direction parallel to the substrate. The magnetic head according to the invention is also characterized in that it has two coils forming the winding (instead of one). These two coils are juxtaposed above the pole pieces. In order to close the magnetic circuit, there is a bridge-shaped magnetic piece having two legs in contact with the two pole pieces, the two coils surrounding said two legs. There is also a conductor bridge connecting the two coils.

The invention also relates to a process for the production of a head as defined hereinbefore.

DESCRIPTION OF EMBODIMENTS

In order to produce a head according to the invention, in conventional manner the first stage consists of producing an amagnetic spacer on a substrate, followed by the deposition on either side of said spacer if a first and a second pole pieces. According to the invention, formation then takes place of a winding having two coils in the following way:

on the first and second pole pieces is deposited an insulating layer, in said insulating layer is etched a first spiral groove above the first pole piece and a second spiral groove above the second pole piece, the first and second grooves are filled with a conductive material and said first and second coils are obtained.

The process continues with the following operations:

the subassembly obtained is covered with another insulating layer, in said other insulating layer are formed a first and a second opening in the center respectively of the first and the second coil, said openings extending up to the first and second magnetic pole pieces, a magnetic material bridge is formed with a first leg using the first opening and making contact with the first pole piece and a second leg using the second opening and making contact with the second pole piece.

According to the invention, the process continues by opening within said other insulating layer a first opening above a first end of the first coil and a second opening above a first end of the second coil. This is followed by the formation of a conductor bridge using the first and second openings, which permits the connection of one coil to the other. It is then merely necessary to produce two connecting blocks or elements connected to the free ends of the two coils. In conjunction with FIGS. 4 to 24, a description will now be given of an embodiment of a magnetic head according to the invention. It is obvious that the materials mentioned and the dimensions indicated are given in a purely explanatory and non-limitative manner.

Figure 1:
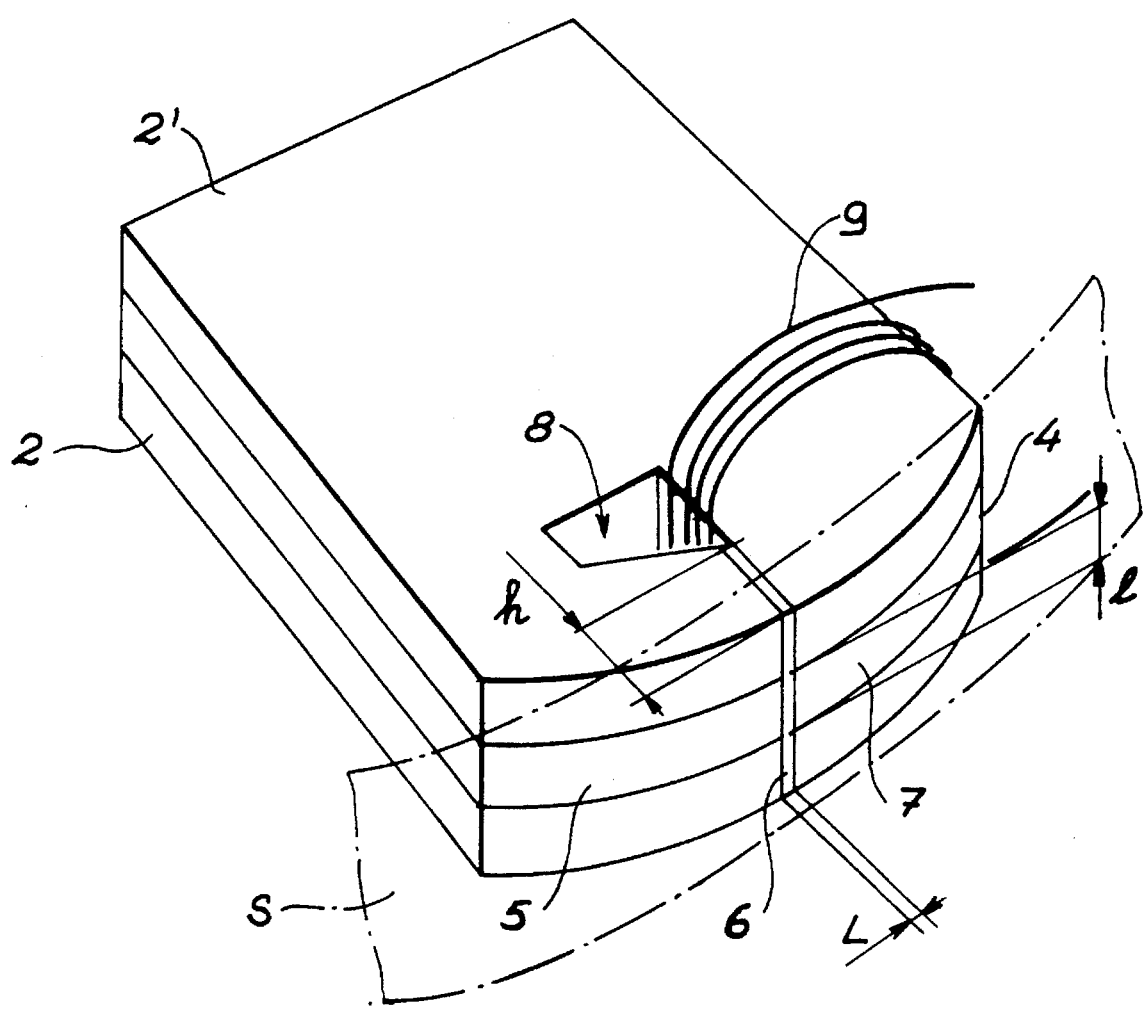
FIG. 1 Illustrates a known magnetic head having a sandwich-type vertical structure.
Figure 3:
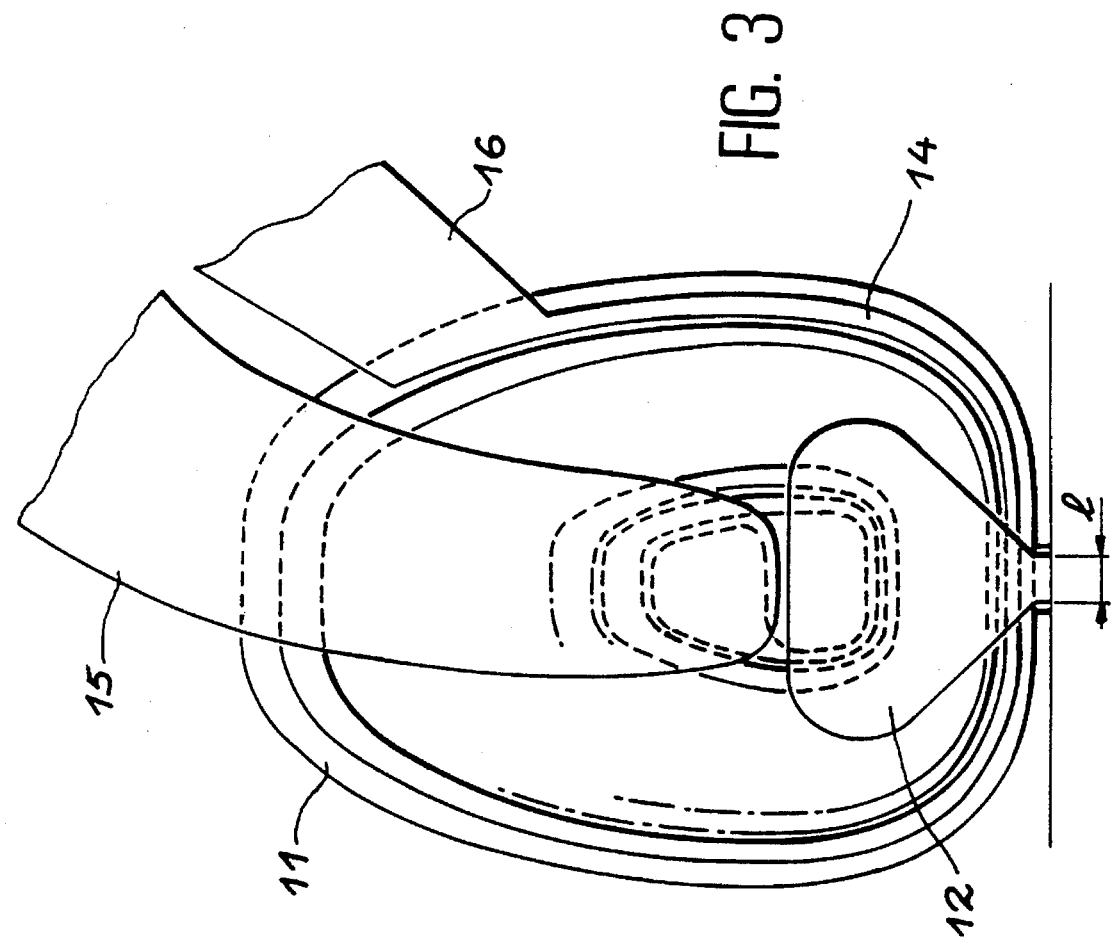
FIG. 3 Shows the same head in a plan view.
Figure 2:
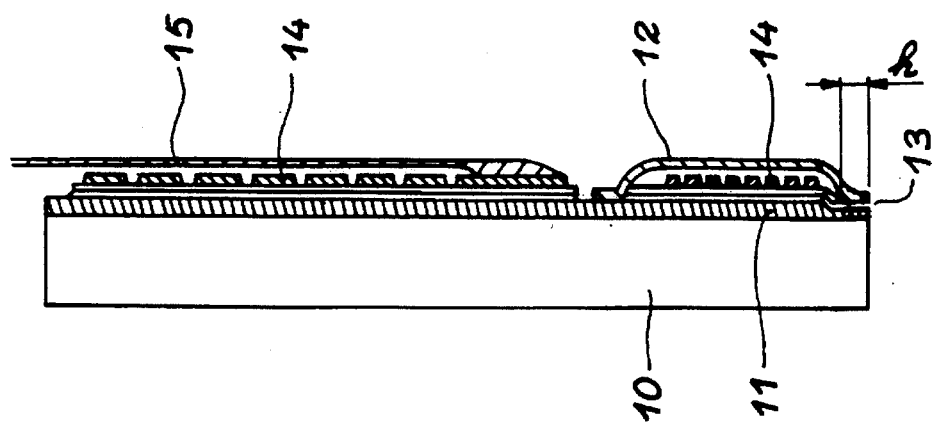
FIG. 2 Illustrates another known magnetic head having superimposed pole pieces (seen from the side).
Figure 4:
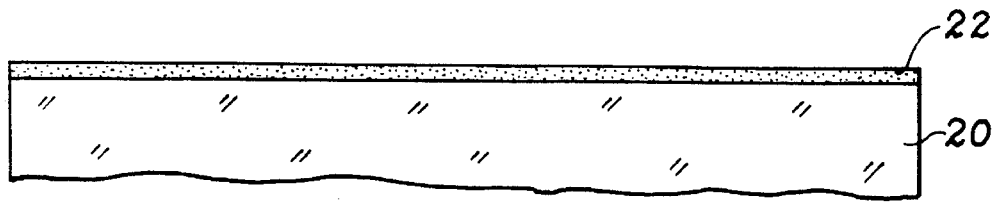
FIG. 4 Shows a first stage in a production process according to the invention.
Figure 5:
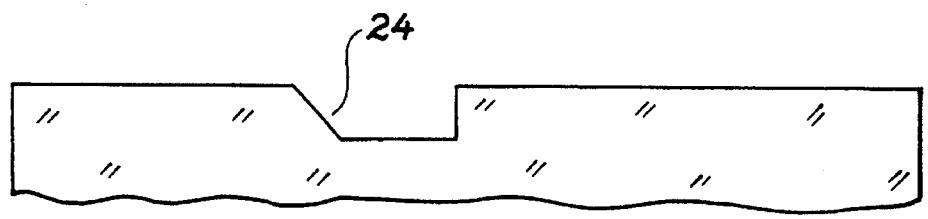
FIG. 5 Shows the result of a first etching with the formation of a first recess.
Figure 6:
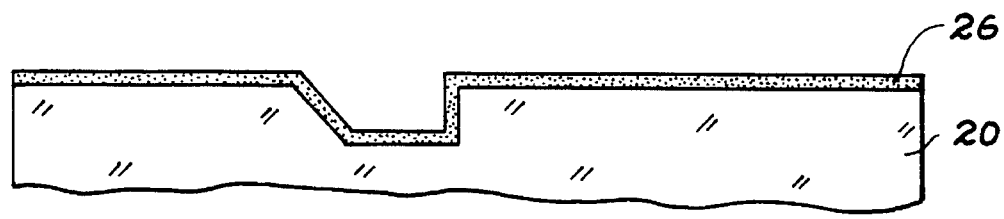
FIG. 6 Shows an insulating layer deposition stage.
Figure 7:
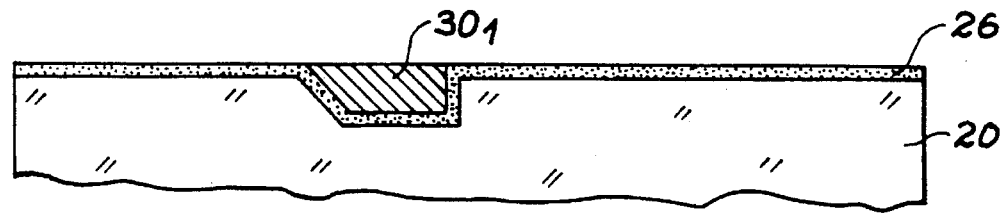
FIG. 7 Shows in section the first pole piece.
Figure 8:
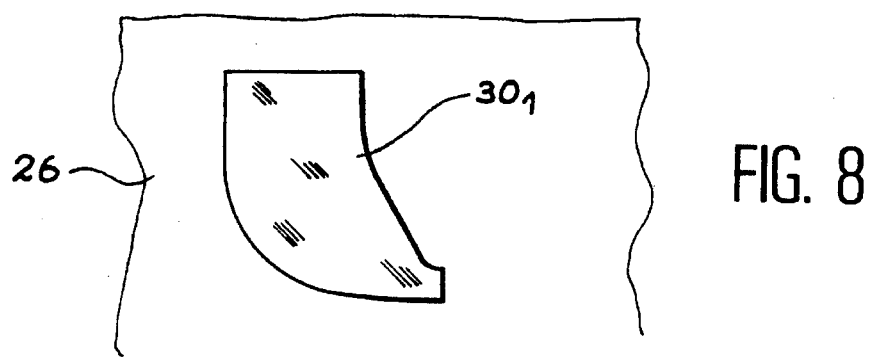
FIG. 8 Shows the same pole piece in a plan view.
Figure 9:
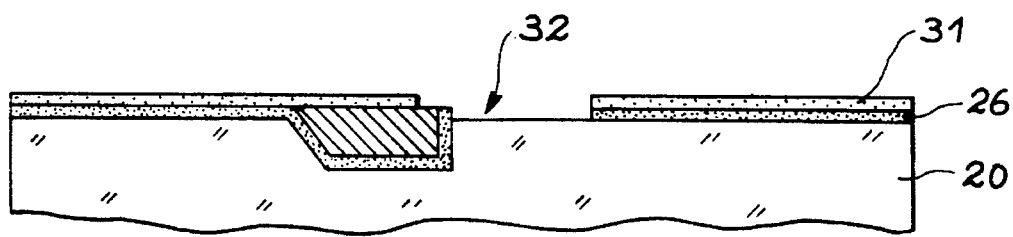
FIG. 9 Shows a preparation stage for a second etching.
Figure 10:
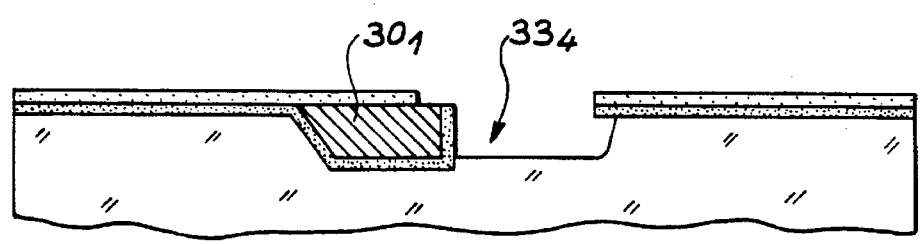
FIG. 10 Shows the formation of a second recess.
Figure 11:
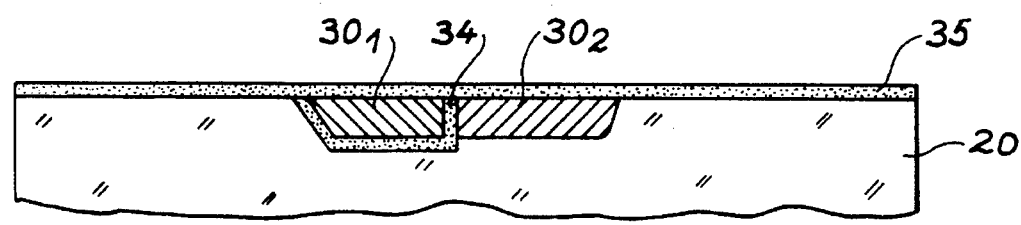
FIG. 11 Shows in section the second pole piece.
Figure 12:
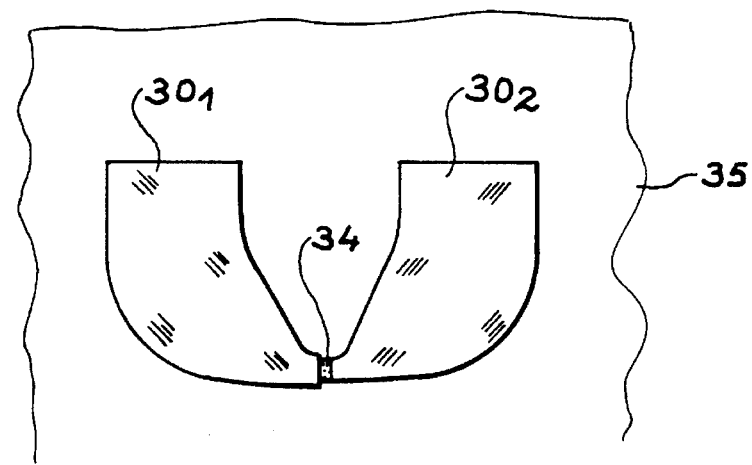
FIG. 12 Shows in plan view the two pole pieces.

The starting product is a silicon substrate 20 having a crystal orientation <110> (FIG. 4). On said substrate is deposited a $Si_3N_4$ insulating layer 22 by low pressure chemical vapour deposition (LPCVD), said insulating layer 22 having a thickness of 40 nm. By means of a lithography operation, the shape of the first pole piece is defined and several grinding guide marks are made. This is followed by the etching of the $Si_3N_4$ layer 22 and the elimination of the resin from the mask. This is followed by the anisotropic etching of the silicon substrate using a KOH solution (70° C.-38%), which leads to a first recess 24 having an inclined flank. This followed by the elimination of the $Si_3N_4$ layer 22 (FIG. 5).

This is followed by a thermal oxidation of the assembly, which creates an oxide layer 26 thereon and which can have a thickness of 0.2 μm.

A magnetic material is then deposited in the recess. It is possible to work e.g. by electrolytic growth. For this purpose, deposition will take place by cathodic sputtering of e.g. a 0.1 μm thick, NiFe conductive sublayer. By a first lithography, a mask is formed having an opening facing the underlayer located in the bottom of the recess. This is followed by e.g. NiFe electrolysis under a magnetic field, in order to obtain magnetic domains oriented parallel to the head gap and then the resin is eliminated.

Instead of operating by electrolytic growth deposition, it would be possible to deposit a magnetic material, such as Sendust, directly by cathodic sputtering, followed by etching through a lithographic mask.

It would also be possible to operate in two stages and intercalate an insulating layer, e.g. of $SiO_2$, between two NiFe electrolysis phases, in order to improve the high frequency performances. (The two electrolysis phases are preceded by a deposition of a conductive layer and a mask.)

This is followed by a mechanical planarization until stoppage occurs on a plane in the layer 26 and this gives the first pole piece $30_1$. This piece is shown in section in FIG. 7 and in plan view in FIG. 8.

On the subassembly obtained deposition then takes place of a 0.2 μm thick, $SiO_2$, second insulating layer 31. By lithography, definition then takes place of an opening 32 and by etching using as the mask the $SiO_2$ layer 31 and what is left of the layer 26, followed by the formation of a second recess $33_4$ by isotropic etching of silicon, by microwave plasma. The $SiO_2$ mask 31 is then eliminated, together with what remains of the layer 26 and a magnetic material $30_2$ is deposited in the second recess. It is once again possible to use NiFe electrolytic growth, as hereinbefore, or Sendust deposition by cathodic sputtering.

Mechanical planarization of the assembly takes place until the head gap 34 appears. This is followed by the deposition of an e.g. 1 μm this, SiO$_2$ layer 35. This gives the two pole pieces 30$_2$ and 30$_2$, as shown in section in FIG. 11 and in plan view in FIG. 12.

Figure 13:
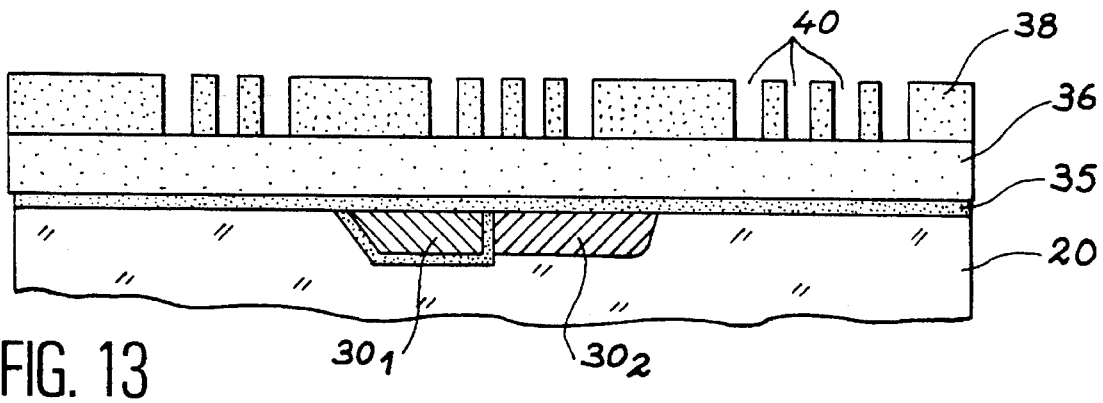
FIG. 13 Illustrates a deposition stage for the insulating layer in which the winding will be produced.

The process continues by the formation of the winding and its two coils. For this purpose the first stage consists of depositing an e.g. 3 μm thick, SiO$_2$ insulating layer 36 (FIG. 13). On said SiO$_2$ layer is deposited a resin layer 38 in which, by lithography, are defined openings 40 (e.g. 40 turns for each future coil).

Figure 14:
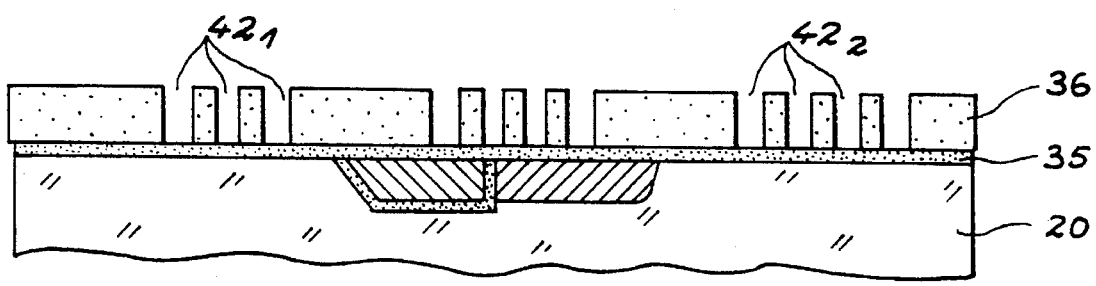
FIG. 14 Illustrates the formation of grooves in the insulating layer.

This is followed by the etching of the SiO$_2$ layer 36 through the mask 38, e.g. by reactive ionic etching. The resin 38 is then eliminated and the subassembly of FIG. 14 is obtained.

Figure 15:
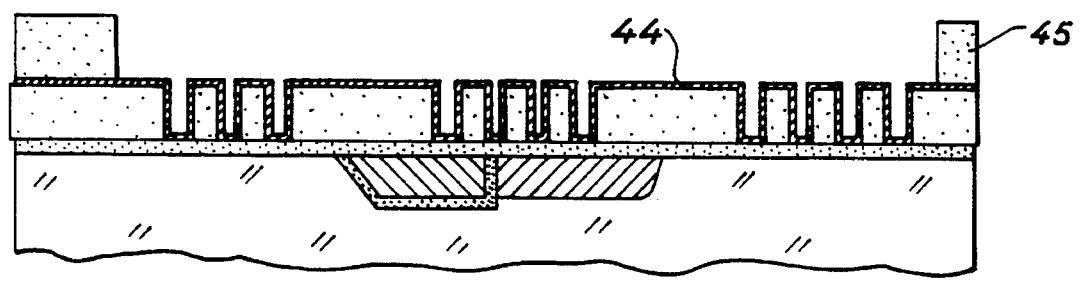
FIG. 15 Shows an underlayer for an electrolytic growth operation.
Figure 16:
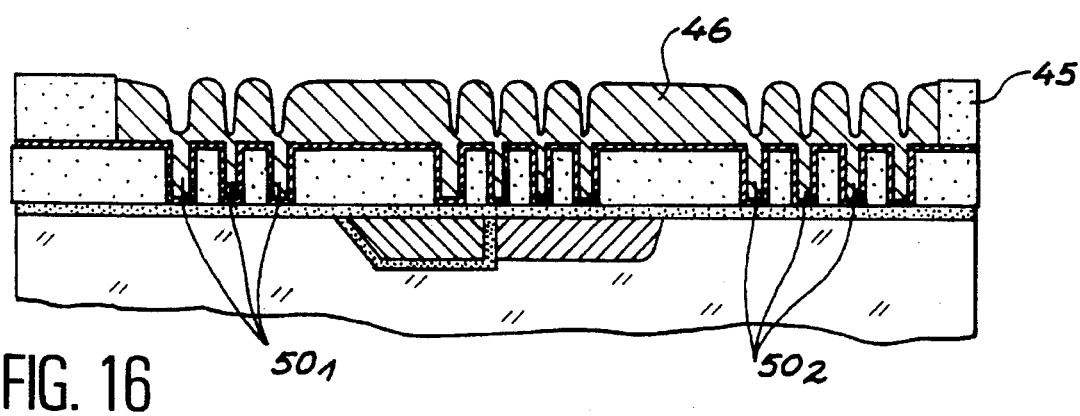
FIG. 16 Shows a subassembly following the electrolytic deposition of a conductive layer.
Figure 17:
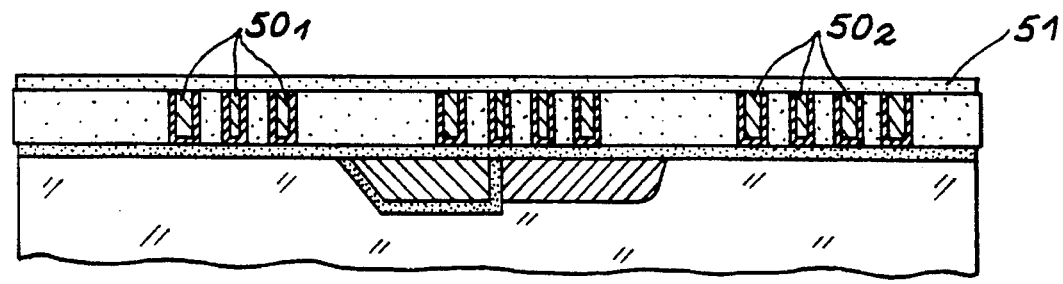
FIG. 17 Illustrates said assembly after grinding and depositing of a further insulating layer.

An electrolysis sublayer 44 is then deposited on the assembly and is e.g. made from chromium-copper and has a total thickness of e.g. 0.2 μm. This layer can be deposited by cathodic sputtering. Resin 45 is then deposited and in it is made an opening, which will define an electrolytic deposition recess, which must have a depth exceeding 1 μm, e.g. 4 μm (FIG. 15).

The electrolytic growth operation is then performed using the layer 44 as the electrode and in this way a metallic layer 46 is formed. The resin 45 is then eliminated and the thus freed electrolytic sublayer is removed by ionic machining. The assembly is then planarized until the layer 36 is exposed and an e.g. 1 μm thick, SiO$_2$, electrical insulation layer 51 is deposited. This gives the subassembly of Rig. 17.

Figure 18:
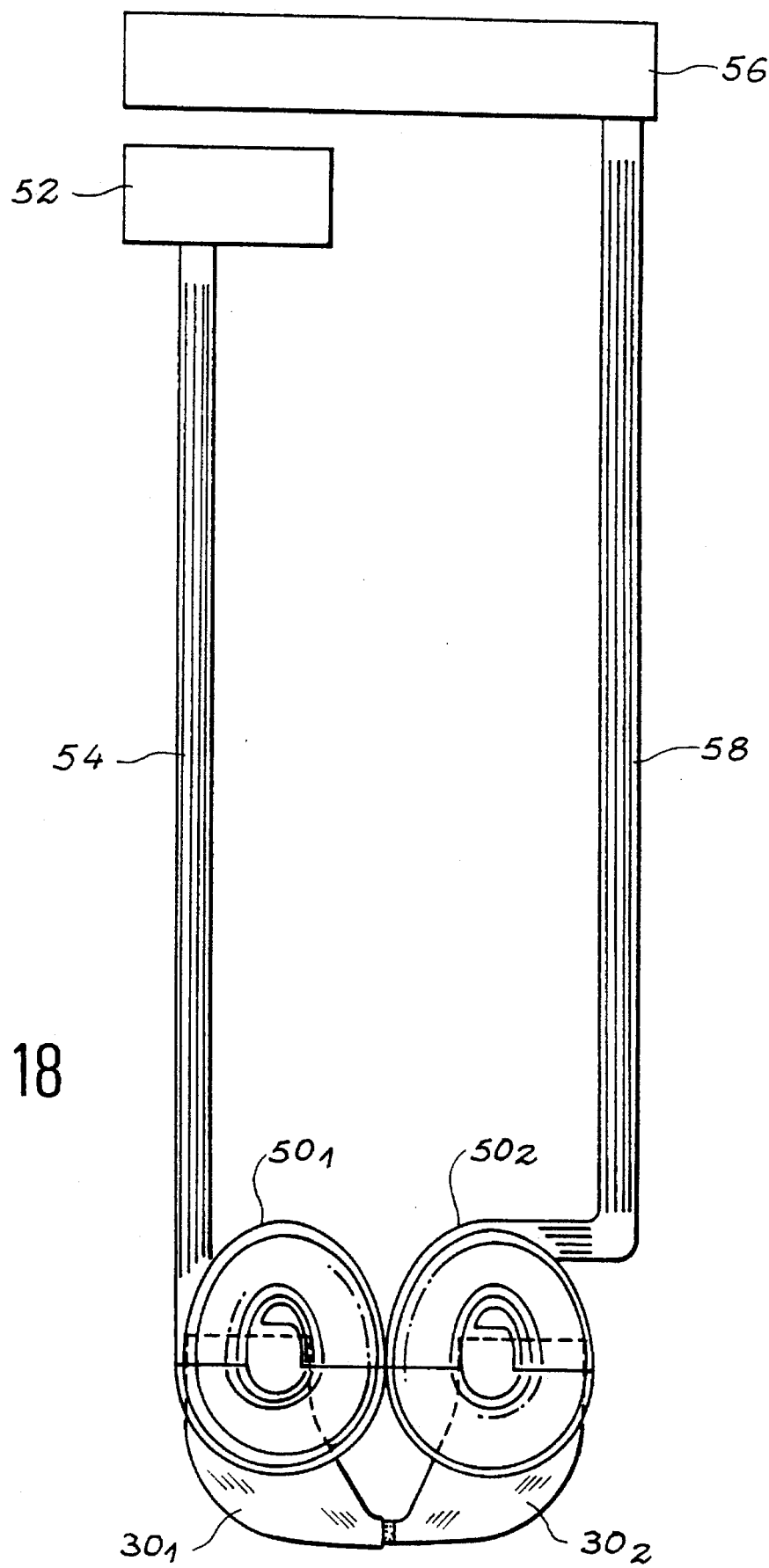
FIG. 18 Shows in plan view the configuration of the two coils with the locations of the future connection blocks.
Figure 22:
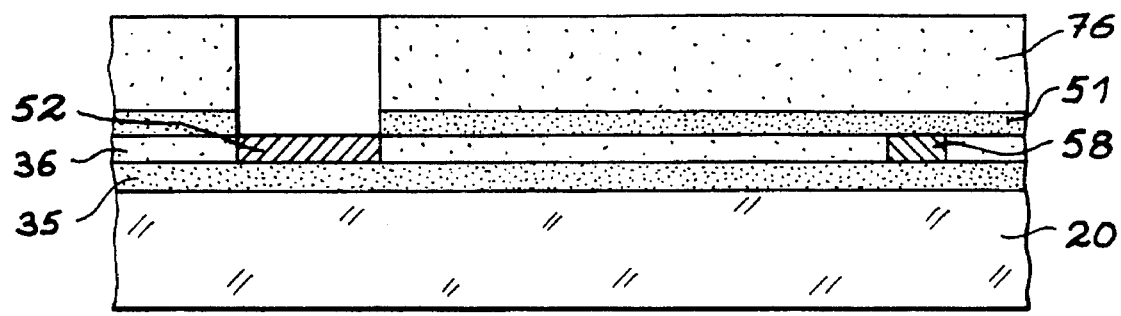
FIG. 22 Shows the preparation for producing connection blocks.
Figure 23:
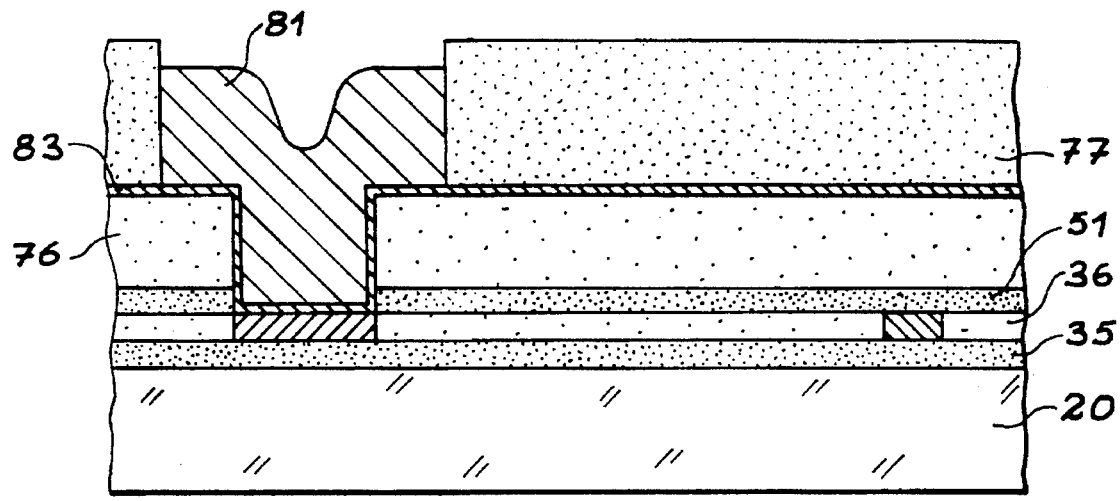
FIG. 23 Shows a connection block following electrolytic growth.
Figure 24:
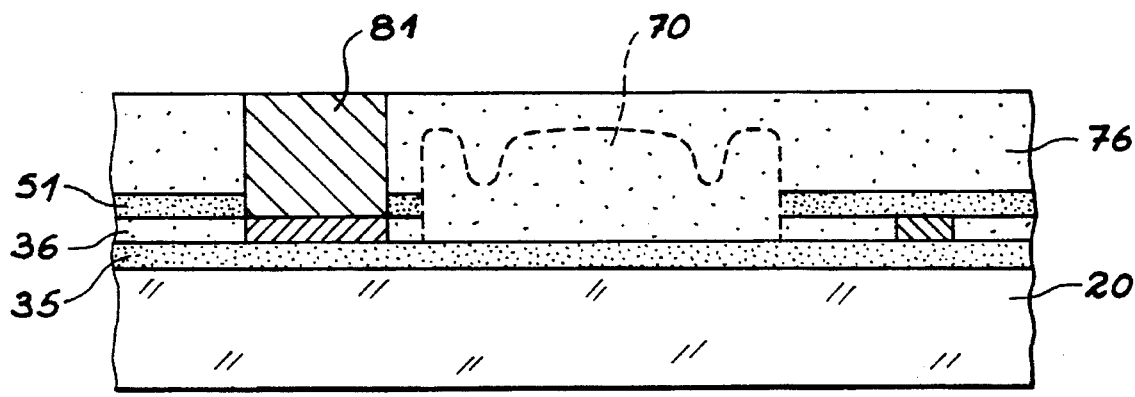
FIG. 24 Shows the planarized block.

FIG. 18 shows in plan view the two coils 50$_1$, 50$_2$, the locations 52 and 56 of the future contact blocks and the connections 54, 58 connecting these locations to the two coils.

Figure 19:
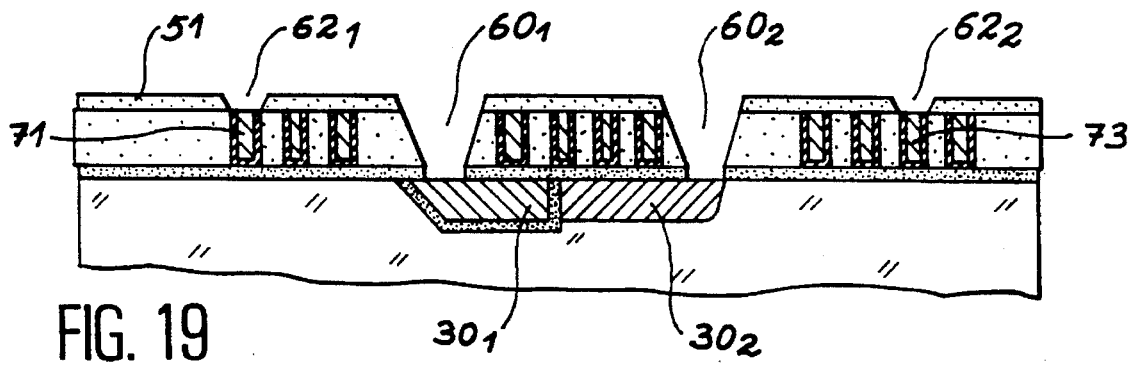
FIG. 19 Illustrates the formation of openings in the insulating layer.

The process is continued by making various openings in the insulating layer 51, namely openings 60$_1$ and 60$_2$ above the first and second pole pieces, as well as openings 62$_1$ and 62$_2$ above certain turns of the coil (FIG. 19). This is followed by the deposition by cathodic sputtering of an electrolytic sublayer 63 and it is possible to use 0.1 μm thick NiFe.

Figure 20:
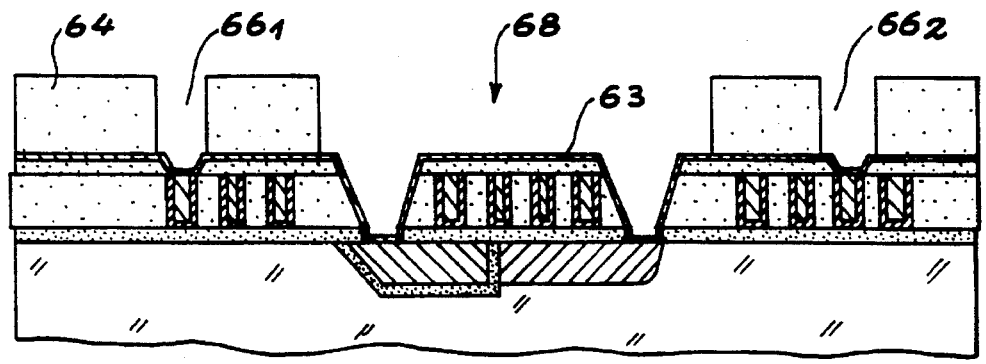
FIG. 20 Shows a resin layer prepared for an electrolytic growth operation.
Figure 21:
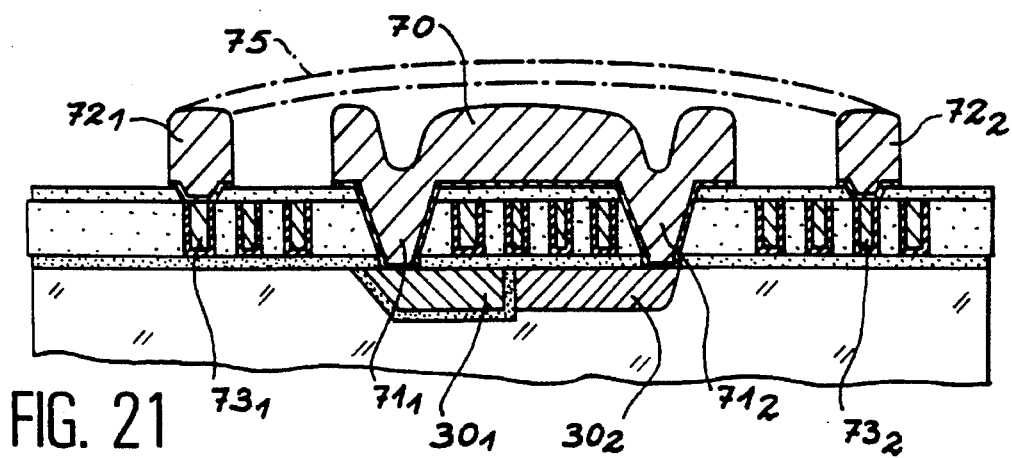
FIG. 21 Shows a subassembly following electrolytic deposition with a magnetic bridge for closing the magnetic circuit.

A resin 64 is then deposited and in it are formed openings 66$_1$ and 66$_2$ above the areas of the future electrical contacts and 68 above the location of the future magnetic bridge (FIG. 20). By NiFe electrolysis, formation then takes place of a magnetic bridge 70 and an electrical bridge 75 (FIG. 21).

Figure 25:
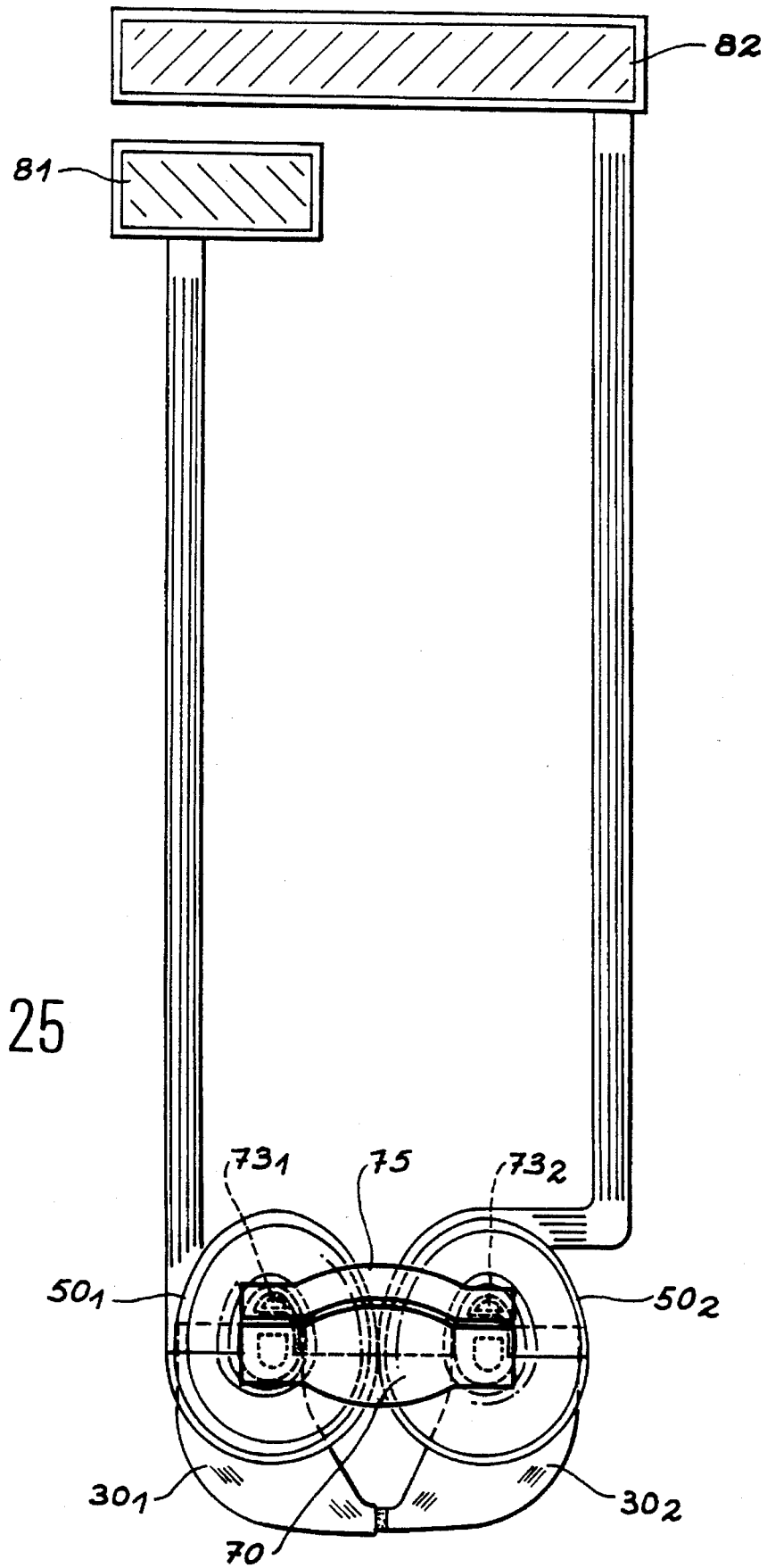
FIG. 25 Shows in plan view the two coils, the magnetic bridge, the conductor bridge and the connection blocks of the winding.

In order to form the electrical contact blocks or elements, an insulating layer 76 (FIG. 22) is deposited on the previously obtained structure, which is then opened above the ends 52 and 56 of the connections of the winding. On the assembly is then deposited an electrolytic sublayer 83, e.g. of 0.2 μm thick CrAu. A resin layer 77 (FIG. 23) is then deposited and in it is formed an opening for electrolytic growth. By gold electrolysis, two blocks 81–82 are formed. The resin 77 is removed and planarization takes place so as to leave the two blocks 81, 82 (only one being shown in section in FIG. 24). FIG. 25 shows the assembly in plan view.

The layers used have a height such that after planarization the blocks 81, 82 have a height exceeding the bridges 70, 75, so that the latter are buried in the insulating layer 76.

All the operations described hereinbefore can be obtained collectively on the same substrate. Using conventional micromechanical operations, it is then necessary to separate the different heads. from one another.

Figure 26:
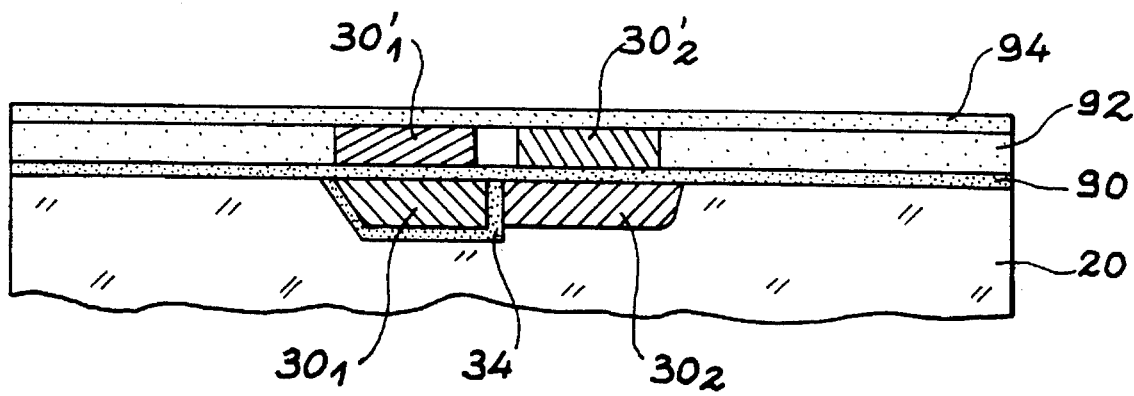
FIG. 26 Illustrates in section a variant of the process in which an oversize or overthickness is formed on the pole pieces.
Figure 27:
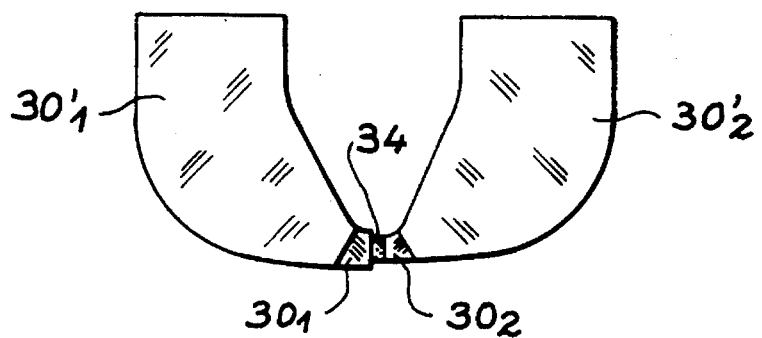
FIG. 27 Shows in plan view the pole pieces and their overthickness.

In a constructional variant, the thickness of these magnetic parts is increased by adding an overthickness. This is shown in FIGS. 26 and 27. Having obtained the pole pieces 30$_1$ and 30$_2$, a thin, e.g. 0.2 μm thick, SiO$_2$ insulating layer 90 is deposited. Deposition then takes place of a 3 μm thick, SiO$_2$ layer 92 in which are edged recesses, whose shape substantially corresponds to the already formed pole pieces. By NiFe electrolytic growth or by cathodic sputtering of Sendust overthicknesses 30'$_1$ and 30'$_2$ are formed above the first and second pole pieces. This is followed by a mechanical planarization and deposition takes place on the assembly of a 1 μm thick, SiO$_2$ layer 94 for the electrical insulation.

FIG. 26 shows the pole pieces and their overthicknesses in section and FIG. 27 the same pieces in plan view.

We, claim:

1. A process for producing a vertical magnetic head with an integrated coil, comprising the steps of:

(a) producing an amagnetic spacer on a substrate; depositing on either side of the spacer a first pole piece and a second pole piece;

(b) depositing on the first and second pole pieces an insulating layer;

(c) etching a first spiral groove in said insulating layer and above the first pole piece and etching a second spiral groove above the second pole piece;

(d) filling said first and second grooves with a conductive material to provide first and second coils;

(e) covering an assembly formed by the steps (a)–(d) with a second insulating layer;

(f) forming first and second openings in said second insulating layer respectively in the center of the first and second coils wherein said openings extend up to said first and said second pole pieces;

(g) opening a third opening in said second insulating layer wherein said third opening is above a first end of said first coil and opening a fourth opening above a first end of said second coil;

(h) forming a magnetic material bridge having a first leg using said first opening extending up to and making contact with said pole piece and with a second leg using said second opening and extending up to and contacting said second pole piece; and (i) forming a conductor bridge using said third and said fourth openings above said first and said second ends of said first and second coils wherein said magnetic bridge and said conductor bridge are formed in a single operation from the same material.

2. The process according to claim 1 wherein said single operation of forming the material bridge and the conductor bridge is an electrolytic growth of the same metal.

3. The process according to claim 2 wherein said metal is iron-nickel.

4. The process according to claim 1 further including the steps of:

(j) forming two connection blocks at two ends of the winding by electrolytic growth of a metal and wherein said blocks have a thickness greater than the thickness of the magnetic bridge and the conductor bridge; and (k) forming openings in the insulating layer having a thickness greater than that of the magnetic bridge and the conductor bridge.

5. The process according to claim 1 wherein, after depositing said first and said second pole pieces on either side of said spacer, an oversized of magnetic material outside the head gap zone is deposited on each of said first and second pieces.

* * * * *